(12) United States Patent
Mercer

(10) Patent No.: US 12,742,553 B2
(45) Date of Patent: Sep. 22, 2026

(54) HEATING MANIFOLD FOR GRILL

(71) Applicant: Premier Specialty Brands LLC, Chamblee, GA (US)

(72) Inventor: Daniel Mercer, Hamilton, GA (US)

(73) Assignee: Premier Specialty Brands LLC, Chamblee, GA (US)

( * ) Notice: Subject to any disclaimer, the term of this patent is extended or adjusted under 35 U.S.C. 154(b) by 372 days.

(21) Appl. No.: 18/521,439

(22) Filed: Nov. 28, 2023

(65) Prior Publication Data

US 2024/0175582 A1 May 30, 2024

Related U.S. Application Data

(60) Provisional application No. 63/428,879, filed on Nov. 30, 2022.

(51) Int. Cl.
*F24B 5/06* (2006.01)
*A47J 37/07* (2006.01)

(52) U.S. Cl.
CPC ............. *F24B 5/06* (2013.01); *A47J 37/0704* (2013.01)

(58) Field of Classification Search
CPC ...... A47J 37/0704; A47J 37/0786; F24B 5/06
See application file for complete search history.

(56) References Cited

U.S. PATENT DOCUMENTS

2006/0191528 A1* 8/2006 Spangrud ................ F24C 3/027 126/275 R
2014/0377423 A1* 12/2014 Silva ...................... A23B 4/052 426/314
2018/0195732 A1* 7/2018 Drummond ......... A47J 37/0754
2022/0087475 A1* 3/2022 Terrell ................... A23B 4/052
2022/0136702 A1* 5/2022 Dean ................... A47J 37/0754 126/77
2023/0288072 A1* 9/2023 Scott ....................... F24B 5/023

* cited by examiner

*Primary Examiner* — Alfred Basichas
(74) *Attorney, Agent, or Firm* — Crowell & Moring LLP

(57) ABSTRACT

A manifold for a grill may include a first and a second arm. The first arm is configured to be positioned on a first side of a grilling area of the grill and the second arm is configured to be positioned on a second side of the grilling area of the grill that is opposite to the first side of the grilling area. The first arm is configured to receive heat originating from a heat source of the grill and to provide an air flow for the heat through an interior passageway of the first arm and out of a plurality of apertures of the first arm. The second arm is configured to receive heat originating from the heat source of the grill and provide an air flow for the heat through an interior passageway of the second arm and out of the plurality of apertures of the second arm.

10 Claims, 10 Drawing Sheets

HEATING MANIFOLD FOR GRILL

RELATED APPLICATION

The present application claims priority to U.S. Provisional Patent Application No. 63/428,879, filed Nov. 30, 2022, the entirety of which is hereby incorporated by reference.

BACKGROUND

Conventional grills have a potential to cause grease fires when a temperature of the grill is raised from a low temperature to a high temperature. Traditionally, grill manifolds that provide heat to a cooking area of a grill are positioned in a center of the cooking area as show in FIG. 1. Due to this location, food positioned in the center of the cooking area for cooking regularly release drippings that land on the centrally positioned manifold. When the grill is heated rapidly after food drippings have fallen on the manifold, the food drips may ignite, resulting in a grease fire.

SUMMARY

The present disclosure addresses this grease fire problem by providing a manifold that provides heat to a cooking area of a grill but is generally positioned at opposite sides of the cooking area rather than a center of the cooking area. As a result, the center of the cooking area is open, thereby allowing food drippings to fall directly to a floor of the grill rather than landing on the manifold.

In one implementation, the present disclosure provides a manifold for a grill comprising a base, a first arm, and a second arm.

The base defines an interior passageway, and comprises a first open end, a second open end, and a third open end, each of which are in communication with the interior passageway of the base.

The first arm defines an interior passageway and a plurality of apertures on a side of the first arm that are in communication with the interior passageway of the first arm. The first arm is connected to the first open end of the base such that the interior passageway of the first arm is in communication with the interior passageway of the base.

The second arm defines an interior passageway and a plurality of apertures on a side of the second arm that are in communication with the interior passageway of the second arm. The second arm is connected to the second open end of the base such that the interior passageway of the second arm is in communication with the interior passageway of the base.

In another implementation, the present disclosure provides a manifold for a grill comprising a first arm and a second arm.

The first arm is configured to be positioned on a first side of a grilling area of the grill. Further, the first arm defines an interior passageway and a plurality of apertures on at least a side of the first arm that are in communication with the interior passageway of the first arm.

The second arm is configured to be positioned on a second side of the grilling area of the grill that is opposite to the first side of the grilling area. The second arm defines an interior passageway and a plurality of apertures on at least a side of the second arm that are in communication with the interior passageway of the second arm.

In this implementation, the plurality of apertures on the side of the first arm face the plurality of apertures on the side of the second arm. Further, the first arm is configured to receive heat originating from a heat source of the grill and to provide an air flow for the heat through the interior passageway of the first arm and out of the plurality of apertures of the first arm. Similarly, the second arm is configured to receive heat originating from the heat source of the grill and provide an air flow for the heat through the interior passageway of the second arm and out of the plurality of apertures of the second arm.

DETAILED DESCRIPTION

The present disclosure is directed to a manifold that provides heat to a cooking area of a grill that includes arms positioned at opposite sides of the cooking area rather than a center of a cooking area. As a result, the center of the cooking area is open, thereby allowing food drippings to fall directly to a floor of the grill rather than landing on the manifold.

Figure 2:
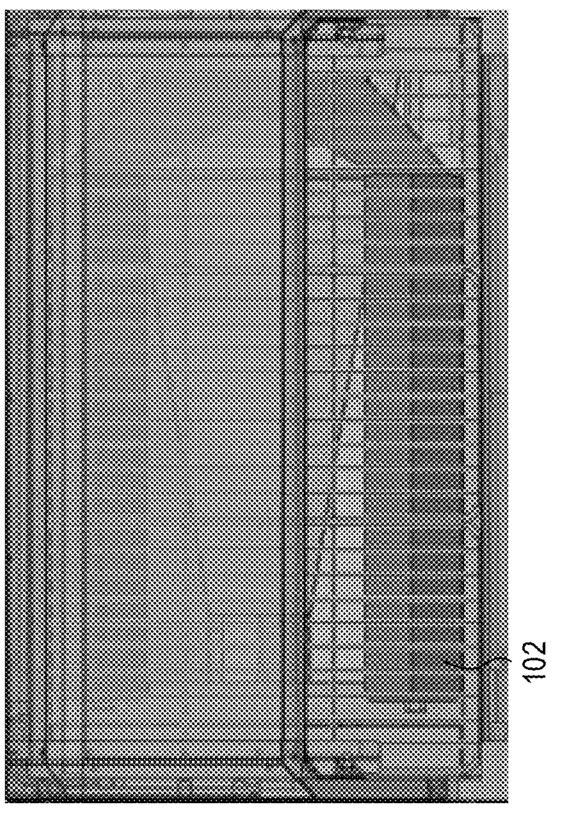
FIG. 2 is a top view of a cooking area of a grill with one form of a manifold of the present disclosure.
Figure 1:
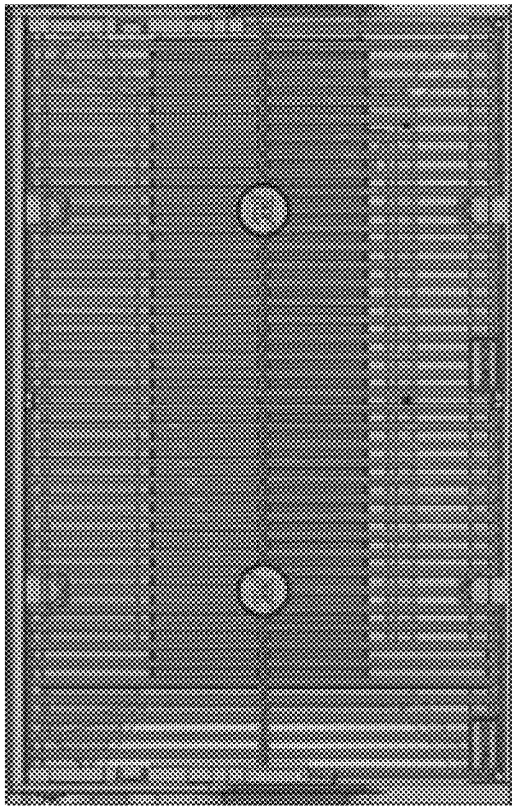
FIG. 1 is a top view of a cooking area of a grill with a traditional manifold.
Figure 3:
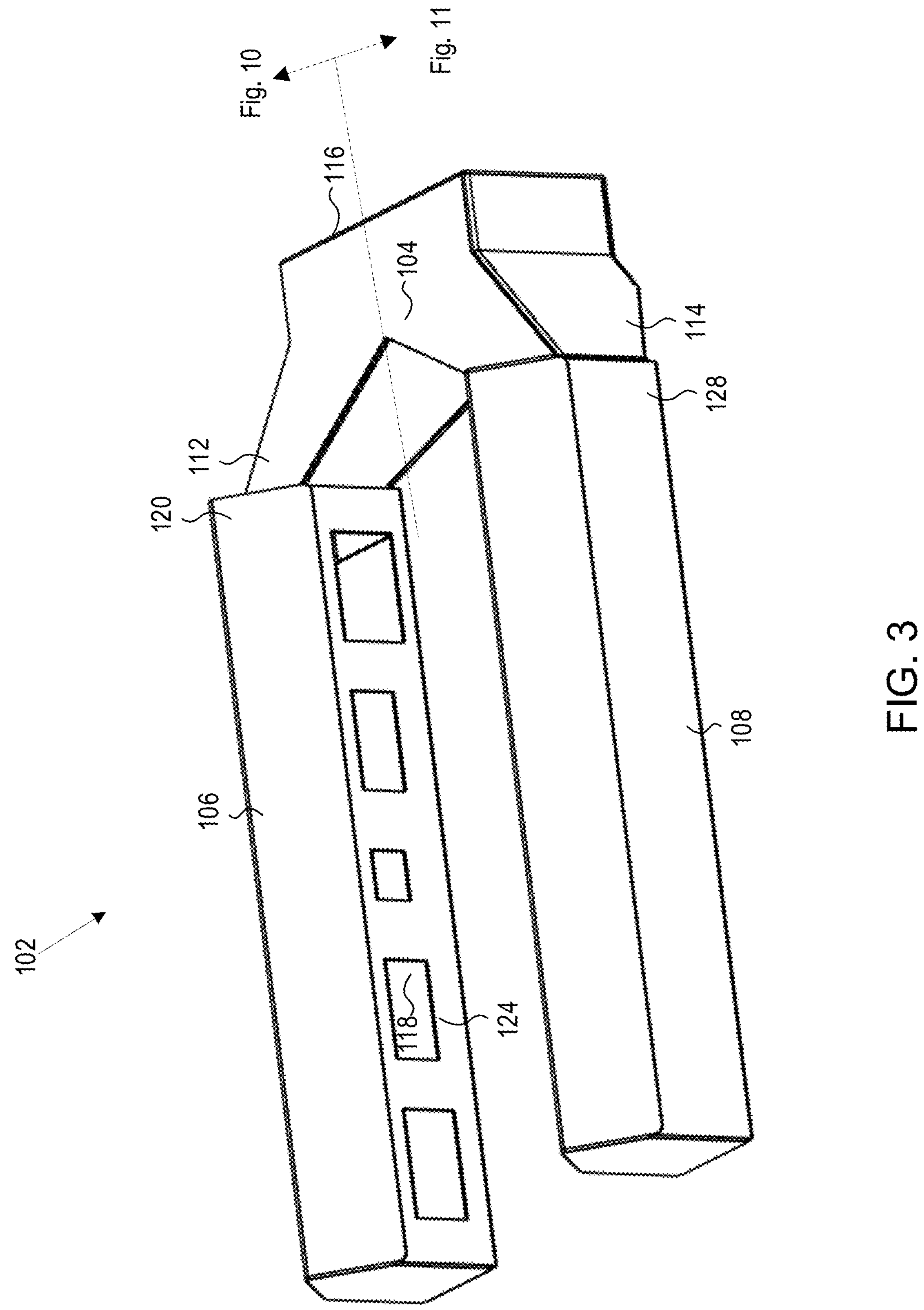
FIG. 3 is a perspective view of one form of a manifold for a grill.
Figure 4:
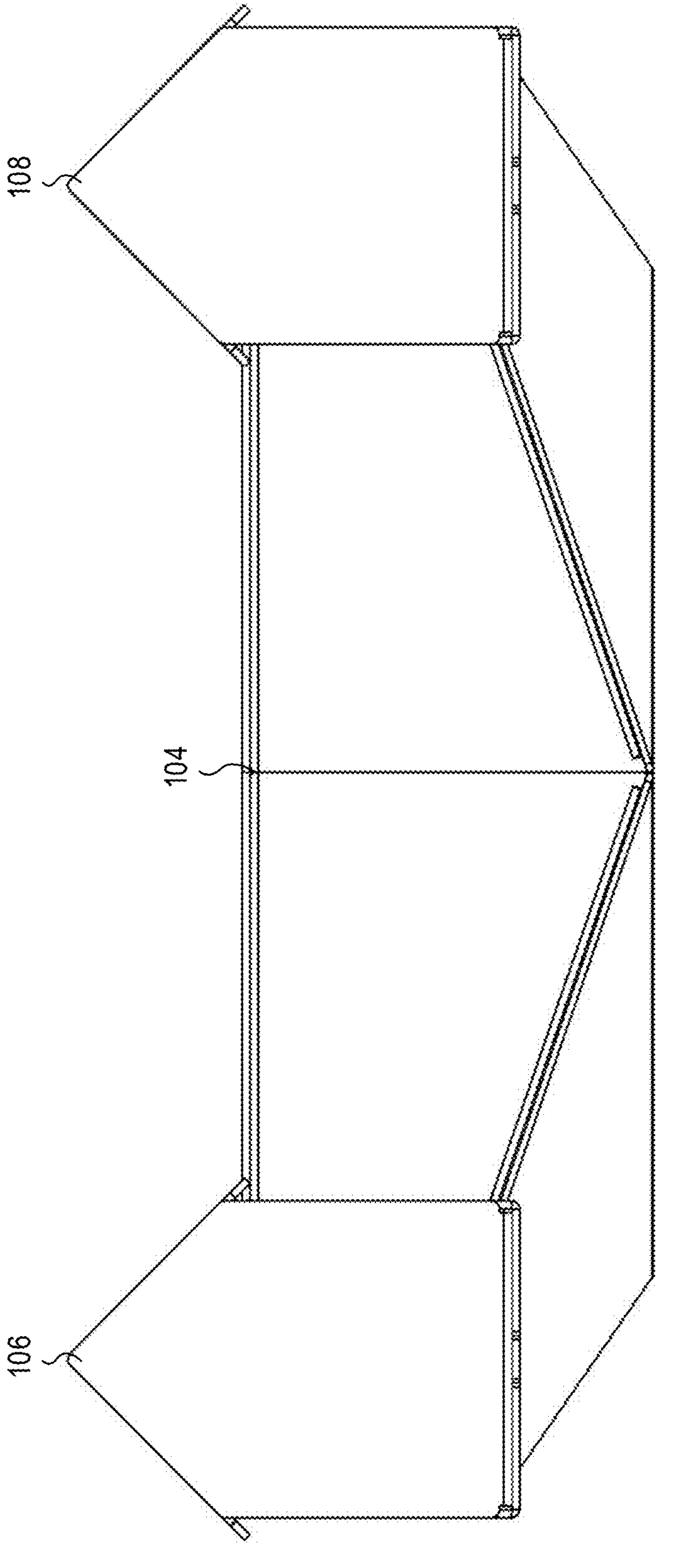
FIG. 4 is a front view of the manifold of FIG. 3.
Figure 5:
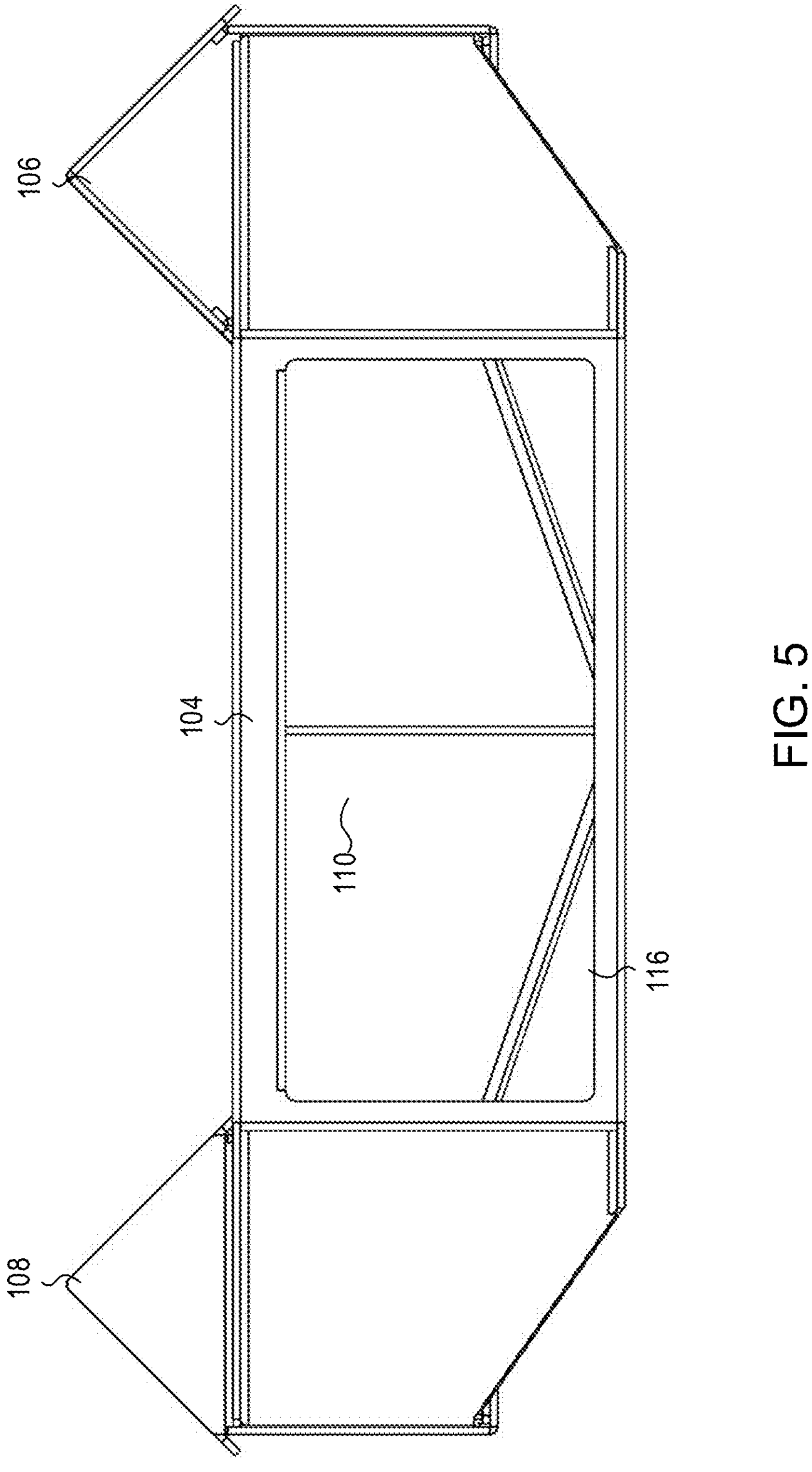
FIG. 5 is a rear view of the manifold of FIG. 3
Figure 6:
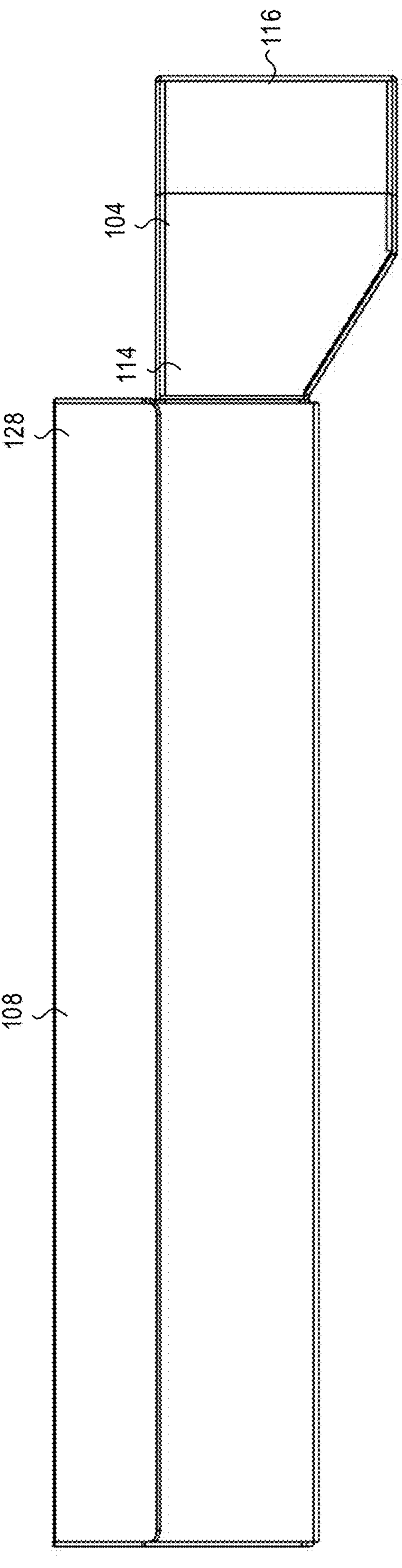
FIG. 6 is a first side view of the manifold of FIG. 3.
Figure 7:
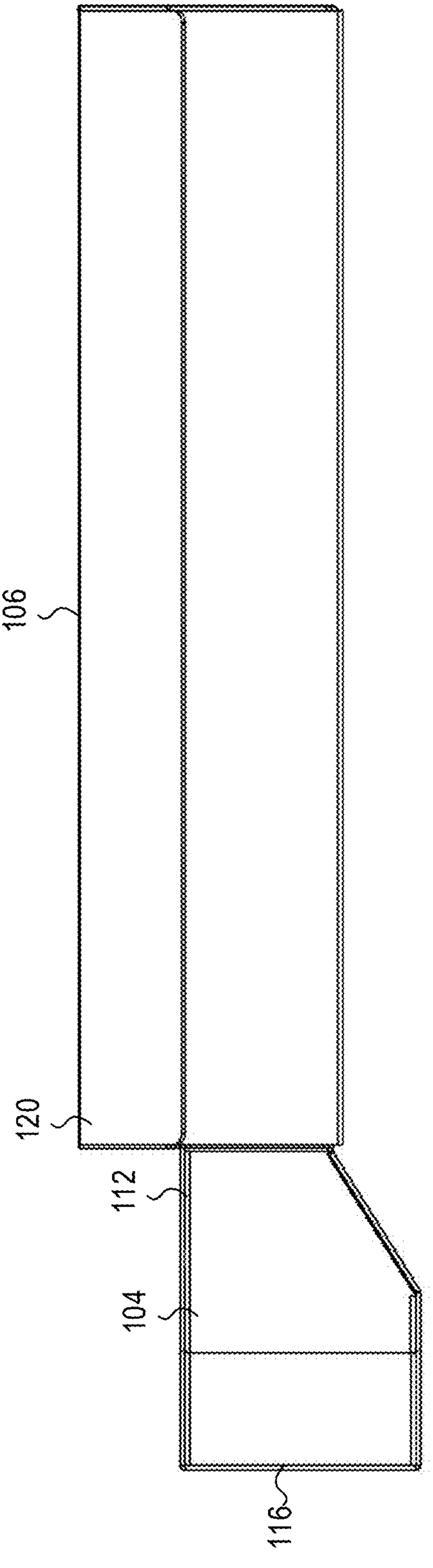
FIG. 7 is a second side view of the manifold of FIG. 3.
Figure 8:
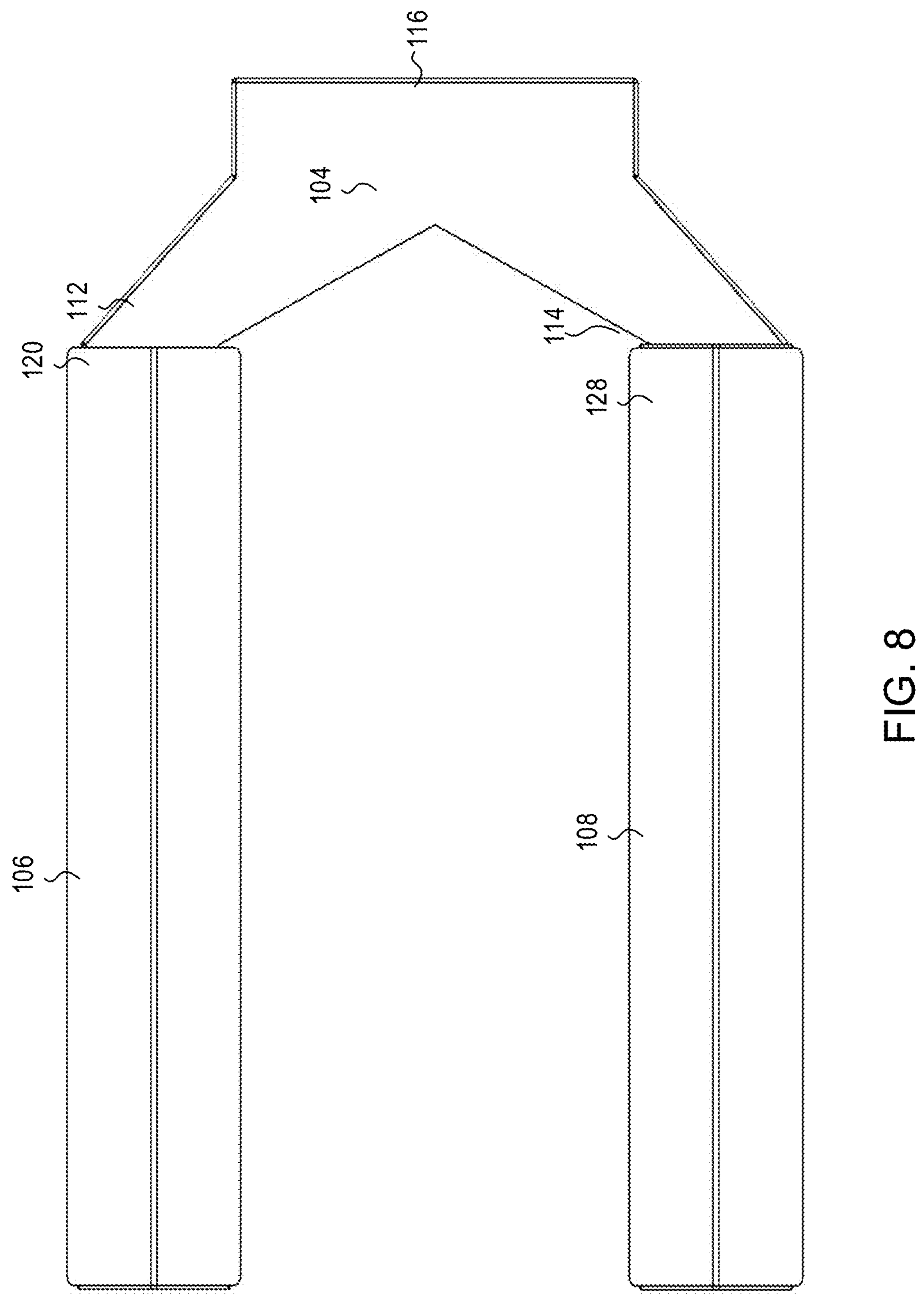
FIG. 8 is a top view of the manifold of FIG. 3.
Figure 9:
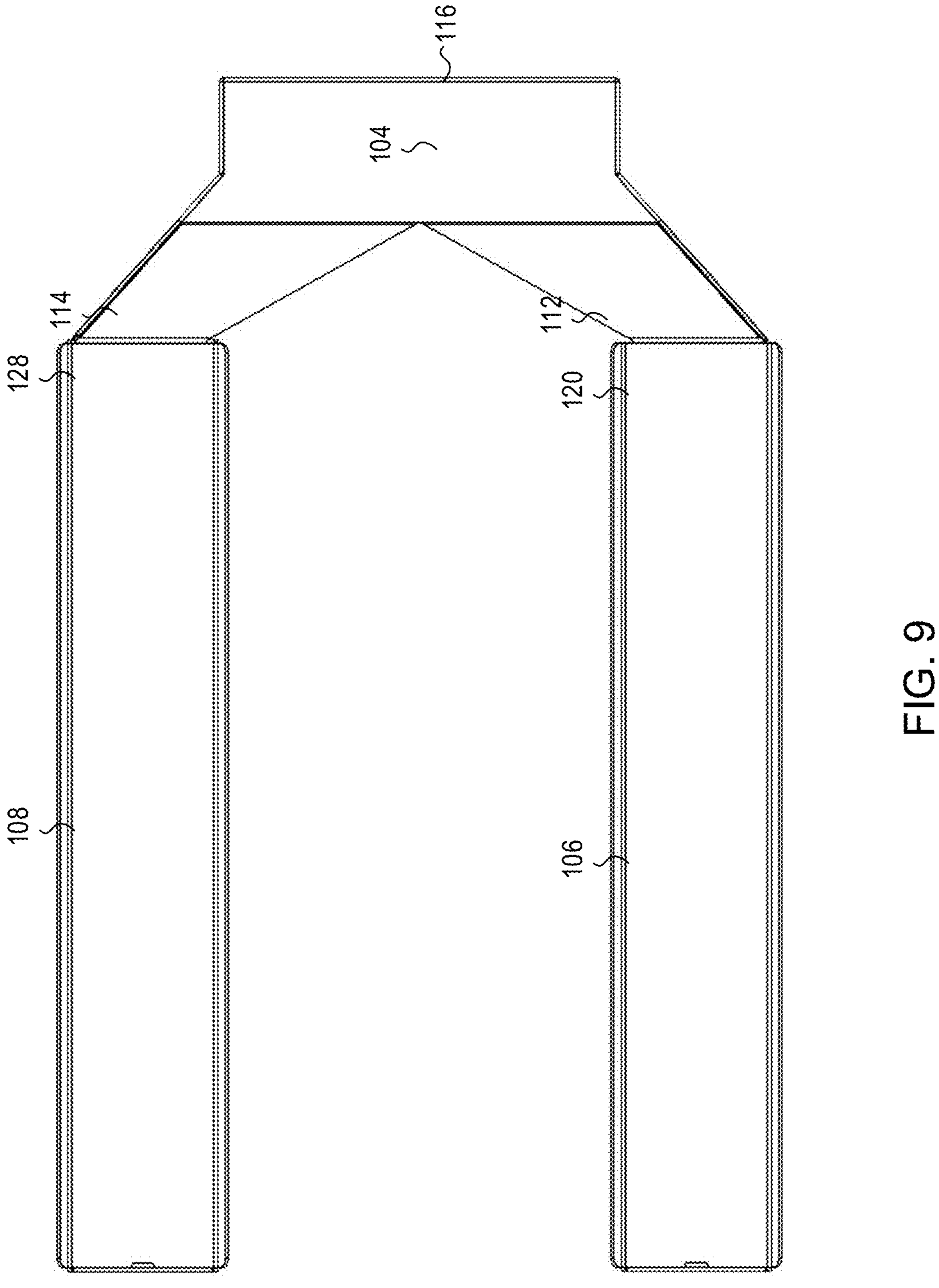
FIG. 9 is a bottom view of the manifold of FIG. 3.

FIG. 2 is a top view of a cooking surface of a grill with one form of a manifold of the present disclosure; FIG. 3 is a perspective view of one form of a manifold of the present disclosure; FIG. 4 is a front view of the manifold of FIG. 3; FIG. 5 is a rear view of the manifold of FIG. 3; FIG. 6 is a first side view of the manifold of FIG. 3; FIG. 7 is a second side view of the manifold of FIG. 3; FIG. 8 is a top view of the manifold of FIG. 3; and FIG. 9 is a bottom view of the manifold of FIG. 3.

Forms of a manifold 102 of the present disclosure that provide heat to a grilling area of a grill may be, for example, Y-shaped or U-shaped, and include a base 104, a first arm 106, and a second arm 108. In some implementations, the manifold 102 may comprise cold rolled steel with a porcelain coating. However, in other implementations, other types of materials may be used.

As shown in FIGS. 3-9, the base 104 defines an interior passageway 110 and a first open end 112, a second open end 114, and a third open end 116 that are each in communication with the interior passageway 110 of the base 104. As discussed in more detail below, when positioned in a grill, the third open end 116 is coupled with a heat source for the grill such that heated air, smoke, and/or flames flow via the third open end 116 into the interior passageway 110 of the base 104.

The first arm 106 defines an interior passageway 118 and defines an open end 120 in communication with the interior passageway 118. When assembled, the open end 120 of the first arm 106 is connected to the first open end 112 of the base such that the interior passageway 110 of the base 104 is in communication with the interior passageway 118 of the first arm 106.

Figures 10, 11:
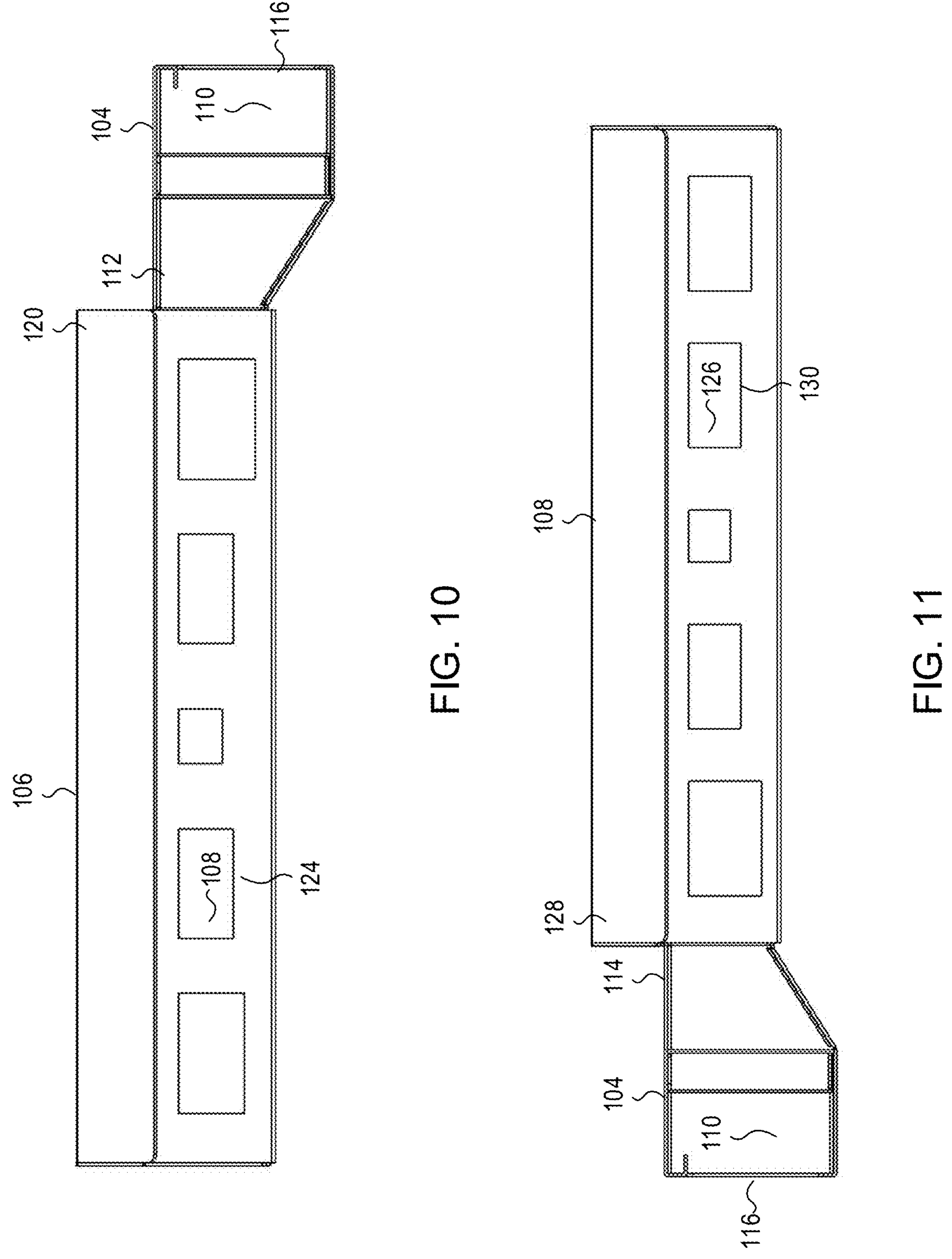
FIG. 10 is a cross-sectional view of the manifold of FIG. 3 illustrating apertures of a first arm.
FIG. 11 is a cross-sectional view of the manifold of FIG. 3 illustrating apertures of a second arm.

The first arm 106 additionally defines a plurality of apertures 124 as shown in FIG. 10 that are in communication with the interior passageway 118 of the first arm 106. In some implementations, the apertures of the plurality of apertures 124 are positioned on one side of the first arm 106. However, in other implementations, the apertures of the plurality of apertures 124 may be positioned on more than one side of the first arm 106. It will be appreciated that when assembled, an air flow is provided from the interior passageway 110 of the base 104, into the interior passageway 118 of the first arm 106, and out of the plurality of apertures 124 of the first arm 106. Accordingly, when heated air, smoke, and/or flames are received at the third open end 116 of the base 104, the heated air, smoke, and/or flames may flow from the base 104 to the first arm 106, and out of the plurality of apertures 124 of the first arm 106.

Similar to the first arm 106, the second arm 108 defines an interior passageway 126 and defines an open end 128 in communication with the interior passageway 126. When assembled, the open end 128 of the second arm 106 is connected to the second open end 114 of the base 104 such that the interior passageway 110 of the base 104 is in communication with the interior passageway 126 of the second arm 108.

The second arm 108 additionally defines a plurality of apertures 130 as shown in FIG. 11 that are in communication with the interior passageway 126 of the second arm 108. In some implementations, the apertures of the plurality of apertures 130 are positioned on one side of the second arm 108. However, in other implementations, the apertures of the plurality of apertures 130 may be positioned on more than one side of the second arm 108. It will be appreciated that when assembled, an air flow is provided from the interior passageway 110 of the base 104, into the interior passageway 126 of the second arm 108, and out of the plurality of apertures 130 of the second arm 108. Accordingly, when heated air, smoke, and/or flames are received at the third open end 116 of the base 104, the heated air, smoke, and/or flames may also flow from the base 104 to the second arm 108, and out of the plurality of apertures 130 of the second arm 108.

In some implementations, the side of the first arm 106 defining the plurality of apertures 124 and the side of the second arm 108 defining the plurality of apertures 130 face each other. In this configuration, the manifold 102 may be positioned as shown in FIG. 2 such that the first arm and second arm 108 are positioned along sides of the cooking area. Due to this positioning, the airflow leaving the plurality of apertures 124 of the first arm 106 and the airflow leaving the plurality of apertures 130 of the second arm 108 flow into a center of the cooking area while also leaving the center of the cooking area open. As a result, food dripping from food positioned in a center of the cooking area of the grill may fall directly to a floor of the grill rather than landing onto the manifold 102.

In some implementations, the apertures of the plurality of apertures 124 of the first arm 106 and of the plurality of apertures 130 of the second arm 108 may be various sized rectangular shapes as shown in the Figures. In some implementations, a size and/or shape of the apertures 124 of the first arm 106 and the plurality of apertures 130 of the second arm 108 are configured to provide even heat distribution with a cooking area of a grill.

Further, in some implementations, to assist in preventing any food drippings from resting on a top of the first arm 106 and a top of the second arm 106 when positioned on the sides of the cooking area, the top of the first arm 106 and/or the top of the second arm 106 may include at least one slanted surface. For example, in some implementations, the top of the first arm 106 and the top of the second arm 106 may each include two slanted surfaces as shown in FIGS. 3-8 that cause food droppings to slide off the top of the first arm 106 and the second arm 108. In some implementations each of the two slanted surface is slanted at 45 degrees. However, in other implementations, other angles may be used for the slanted surfaces.

Figure 12:
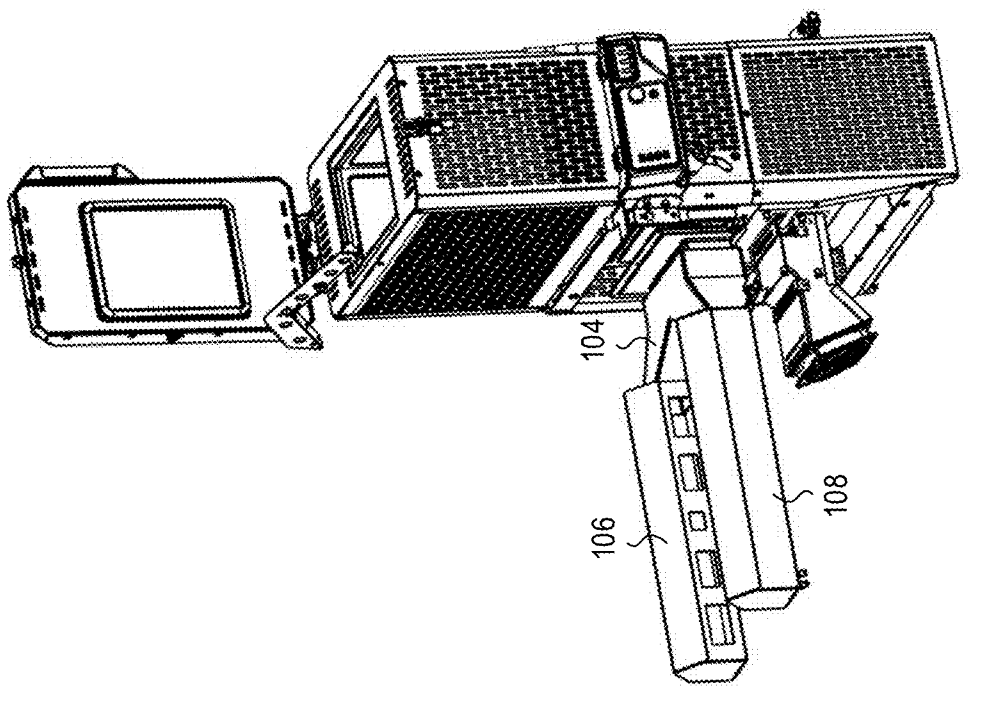
FIG. 12 is an illustration of the manifold of FIG. 3 coupled with a heat source of a grill such as a gravity fed charcoal hopper.

As noted above, the manifold 102 may receive heated air, smoke, and/or flames that originate from heat sources outside the manifold 102 such as burning charcoal or wood. For example, in some implementations, as shown in FIG. 12, the third open end 116 of the base 104 of the manifold 102 may be coupled with a charcoal hopper such as the hopper described in U.S. patent application Ser. No. 16/535,826, filed Aug. 8, 2019, the entirety of which is hereby incorporated by reference.

It will be appreciated that in this configuration, heated air, smoke, and/or flames from the hopper may flow into the interior passageway 110 of the base 104, into the interior passageway 118 of the first arm 106, and out of the plurality of apertures 124 of the first arm 106 and/or flow from the interior passageway 110 of the base 104, into the interior passageway 126 of the second arm 108, and out of the plurality of apertures 130 of the second arm 108, as described above.

As described above in reference to the drawings, the present disclosure provides manifolds that provides heat to a cooking area of a grill that includes arms positioned at opposite sides of the cooking area rather than a center of a cooking area. As a result, the center of the cooking area is open, thereby allowing food drippings to fall directly to a floor of the grill rather than landing on the manifold.

Although certain embodiments and implementations of the disclosure have been specifically described herein, it will be apparent to those skilled in the art to which the disclosure pertains that variations and modifications of the various embodiments shown and described herein may be made without departing from the spirit and scope of the disclosure. Accordingly, it is intended that the disclosure be limited only to the extent required by the appended claims and the applicable rules of law.

The invention claimed is:

1. A manifold for a grill comprising:

a base defining an interior passageway, the base comprising a first open end, a second open end, and a third open end, each of which are in communication with the interior passageway of the base;

a first arm defining an interior passageway and a plurality of apertures on a side of the first arm that are in communication with the interior passageway of the first arm, wherein the first arm is connected to the first open end of the base such that the interior passageway of the first arm is in communication with the interior passageway of the base; and a second arm defining an interior passageway and defining a plurality of apertures on a side of the second arm that are in communication with the interior passageway of the second arm, wherein the second arm is connected to the second open end of the base such that the interior passageway of the second arm is in communication with the interior passageway of the base;

wherein the manifold is configured such that at least the first arm and the second arm are positioned below a cooking surface of the grill;

wherein the plurality of apertures of the first arm face the plurality of apertures of the second arm; and wherein a top side of the first arm and a top side of the second arm positioned below the cooking surface comprise at least two slanted surfaces, where the top side of the first arm and the top side of the second arm positioned below the cooking surface do not define apertures.

2. The manifold of claim 1, wherein the manifold is Y-shaped.

3. The manifold of claim 1, wherein the manifold is U-shaped.

4. The manifold of claim 1, where an aperture of the plurality of apertures of the first arm is rectangular.

5. The manifold of claim 1, wherein the third open end of the base is configured to couple with a heat source of a grill.

6. The manifold of claim 5, wherein the heat source is a charcoal hopper.

7. The manifold of claim 1, wherein the manifold is configured such that when positioned in the grill, the first arm and the second arm are positioned on opposite side of a grilling area of the grill.

8. A manifold for a grill comprising:

a first arm configured to be positioned on a first side of a grilling area of the grill, the first arm defining an interior passageway and a plurality of apertures on at least a side of the first arm that are in communication with the interior passageway of the first arm; and a second arm configured to be positioned on a second side of the grilling area of the grill that is opposite to the first side of the grilling area, the second arm defining an interior passageway and a plurality of apertures on at least a side of the second arm that are in communication with the interior passageway of the second arm;

wherein the plurality of apertures on the side of the first arm face the plurality of apertures on the side of the second arm;

wherein the first arm is configured to receive heat originating from a heat source of the grill and provide an air flow for the heat through the interior passageway of the first arm and out of the plurality of apertures of the first arm; and wherein the second arm is configured to receive heat originating from the heat source of the grill and provide an air flow for the heat through the interior passageway of the second arm and out of the plurality of apertures of the second arm;

wherein the manifold is configured such that at least the first arm and the second arm are positioned below a cooking surface of the grill; and wherein a top side of the first arm and a top side of the second arm positioned below the cooking surface comprise at least two slanted surfaces, where the top side of the first arm and the top side of the second arm positioned below the cooking surface do not define apertures.

9. The manifold of claim 8, wherein the manifold is Y-shaped.

10. The manifold of claim 8, wherein the manifold is U-shaped.

* * * * *